United States Patent
Koberg (10) Patent No.: US 8,100,054 B2
(45) Date of Patent: Jan. 24, 2012

(54) CLAMPING DEVICE, SYSTEM AND METHOD FOR CLAMPING FLEXIBLE PLATES ONTO AN IMAGING CYLINDER

(75) Inventor: Jörg Koberg, Hohenwestedt (DE)

(73) Assignee: Esko-Graphics Imaging GmbH, Itzehoe (DE)

( * ) Notice: Subject to any disclaimer, the term of this patent is extended or adjusted under 35 U.S.C. 154(b) by 783 days.

(21) Appl. No.: 11/841,554

(22) Filed: Aug. 20, 2007

(65) Prior Publication Data

US 2008/0047447 A1 Feb. 28, 2008

Related U.S. Application Data

(60) Provisional application No. 60/840,129, filed on Aug. 25, 2006.

(51) Int. Cl.
*B41F 27/12* (2006.01)
(52) U.S. Cl. .................... 101/415.1; 101/409
(58) Field of Classification Search ........... 101/409, 101/415.1
See application file for complete search history.

(56) References Cited

U.S. PATENT DOCUMENTS

| | | | |
|---|---|---|---|
| 2,622,000 A | 12/1952 | Thompson | 346/138 |
| 3,869,985 A * | 3/1975 | Steinmetz et al. | 101/415.1 |
| 4,390,176 A | 6/1983 | Kato | 271/270 |
| 5,396,842 A * | 3/1995 | Quinci et al. | 101/409 |
| 5,553,545 A * | 9/1996 | Turner | 101/415.1 |
| 5,709,150 A | 1/1998 | Durr et al. | 101/415.1 |
| 5,904,351 A | 5/1999 | Masek | 271/277 |
| 6,260,482 B1 * | 7/2001 | Halup et al. | 101/477 |
| 6,561,094 B1 | 5/2003 | Schneider et al. | 101/415.1 |
| 6,598,530 B1 | 7/2003 | Schneider et al. | 101/486 |
| 6,705,226 B1 | 3/2004 | McManus | 101/409 |
| 2004/0113351 A1 | 6/2004 | Bouchal et al. | 271/106 |
| 2004/0114191 A1 | 6/2004 | Salvestro | 358/3.29 |

(Continued)

FOREIGN PATENT DOCUMENTS

GB 1079889 A 8/1967

OTHER PUBLICATIONS

"Higher productivity, quality and ease of operation." Asian Flexo Magazine, Jul./Aug. 2003, p. 6. Available from Callahan Publishing Pte Ltd, 174 Blair Road, Singapore 089917 or from the Afta Singapore: Asian flexo Magazine website at <http://www.afta.com.sg/asian_magazine.htm>.

(Continued)

*Primary Examiner* — Leslie J Evanisko
(74) *Attorney, Agent, or Firm* — Dov Rosenfeld; INVENTEK (57) ABSTRACT

An imaging cylinder includes a clamping device embodiment with a pair of independent adjacent clamping elements, and a method embodiment includes placing end edges of a flexible plate between each of the clamping elements of the clamping device and a surface approximately flush with the outer surface of the cylinder. One or more biasing devices, e.g., springs are used to impart a force onto the placed plate towards the surface approximately flush with outer surface of the cylinder. For each independent clamping element, a crank and lever mechanism or other means to translate rotative motion to approximately rectilinear motion is used to open a space between the clamping element and the outer surface when a rotative force is manually applied to provide for mounting and unmounting an end of a plate.

12 Claims, 9 Drawing Sheets

U.S. PATENT DOCUMENTS

| | | | |
|---|---|---|---|
| 2004/0187721 A1 | 9/2004 | Salvestro | 101/463.1 |
| 2006/0174791 A1 | 8/2006 | Koberg | 101/415.1 |

OTHER PUBLICATIONS

"Technical Specifications—CDI Family." *Esko-Graphics*, Gent, Belgium. Downloaded on Jan. 18, 2005 from <http://www2.dupont.com/Packaging_Graphics/en_US/assets/downloads/pdf/CDI Spark 2530_us.pdf>.

"Workflow and Proofing Products for package printing and converting." Product Brochure, 2004 Creo Inc., 3700 Gilmore Way, Barnaby, British Columbia, Canada. Creo Inc. is now part of Eastman Kodak Company.

"Flexographic Prepress." Product Brochure, 2004 Creo Inc., 3700 Gilmore Way, Barnaby, British Columbia, Canada. Creo Inc. is now part of Eastman Kodak Company.

"White Paper: Cyrel Digital Imager CtP Flexo System." *Esko-Graphics*, Gent, Belgium. Downloaded on Apr. 14, 2005 from: <http://www.esko-graphics.com/files/pdf/_other/EG_wp010dfus.pdf>.

Extended EP Search Report on EP Application 07016627 mailed Jul. 16, 2008.

* cited by examiner

CLAMPING DEVICE, SYSTEM AND METHOD FOR CLAMPING FLEXIBLE PLATES ONTO AN IMAGING CYLINDER

RELATED APPLICATIONS

The present invention claims priority and is a conversion of U.S. Provisional Patent Application No. 60/840,129 filed Aug. 25, 2006 to inventor Koberg, titled CLAMPING DEVICE FOR CLAMPING FLEXIBLE PLATES ONTO AN IMAGING CYLINDER. The contents of such provisional patent application are incorporated herein by reference.

BACKGROUND

The present invention is related to the field of exposing (imaging) printing plates, and in particular, a clamping device for flexible plates that may have different thickness and/or format onto an imaging cylinder, e.g., for exposure in a computer-to-plate imaging device by light energy according to imaging data.

Flexographic plates are frequently exposed from computer data using computer-to-plate (CTP, C2P) imaging. Mounting such plates on a cylinder, e.g., the cylinder or drum of an external drum imaging device is recognized as a problem. For example, one method to mount a flexographic plate on a cylinder is to fix the plates with adhesive tape at the edges. More modern methods use a clamping bar, which clamps the top and bottom edge of a full-size flexographic plate onto the cylinder. The adhesive tape method is very time consuming and the second method using a clamping bar only works with full format plates. Since flexographic plate material is relatively expensive a modern method to mount partial plates on a full format cylinder are becoming more and more important.

An example of an external drum imaging device for which such a method and apparatus is applicable is the Esko-Graphics Cyrel Digital Imager (CDI) made by Esko-Graphics A/S, Ballerup, Denmark, the assignee of the present invention.

There is a need in the art for an economical easy-to-use method and apparatus to mount plates of different thickness and format directly onto the imaging cylinder.

In this description and in the claims, by a full-format plate is meant a plate that covers the whole imaging area of the cylinder. By a partial-format plate is meant a plate that covers part of the overall imaging area, such that several partial-format plates (also called plate segments) may be combined to cover the whole imaging area.

One prior art method is for a machine operator to manually mount a full-format plate or partial-format plates onto a cylinder with adhesive tape. Such a method is used, for example, by external drum imaging machines such as the ThermoFlex™ product line made by CREO Inc. of Burnaby, BC, Canada. However, to mount full-format or partial-format plates with adhesive tape is highly time consuming, the operator first mounts a first edge of the plate on the cylinder, fixes it with adhesive tape, turns the cylinder around so that the plate covers the cylinder, and then tapes all the rest of the edges of the plate.

Another prior art solution is for the machine operator to mount full-format plates—those that fully cover the circumference of a cylinder—with the use of a clamp, which is activated manually. An example of a device for so mounting full-format plates is a device used with an imaging drum, called EasyClamp™, made by Esko-Graphics A/S, Ballerup, Denmark, the assignee of the present invention. If partial-format plates are used, the machine operator first mounts partial-format plates onto the cylinder with the use of adhesive tape. The mounting by use of adhesive tape, as stated above, is time consuming.

Yet another prior art solution is for the machine operator to mount full-format plates—the case of the circumference of the cylinder being fully covered by the plate—using a terminal strip, which is activated manually. For mounting a plate, the terminal strip has to be opened manually, the plate has to be fixed under the terminal strip, the terminal strip has to be closed manually, the cylinder then has to be turned around, the terminal strip has to be opened manually again, the second plate edge has to be positioned under the terminal strip and then the terminal strip has to be closed manually. In all cases with the use of a terminal strip, the activation is done by manually by turning a key. This method is suggested, for example, in the HelioFlex® range of products made by HELL Gravure Systems GmbH of Kiel, Germany.

Note that as is the case with the Esko-Graphics EasyClamp™, the terminal strip is only for full-format plates. The machine operator mounts partial-format plates with the use of adhesive tape. The mounting by use of adhesive tape, as stated above, is time consuming.

There is thus a need in the art for a method and apparatus that improves the manual steps of opening and closing clamping devices or a terminal strip.

There further is a need in the art for an imaging cylinder such as a printing-plate-holding imaging cylinder that includes a plurality of clamping devices, positioned in a respective plurality of different axial positions, in a respective plurality of different circumferential positions, and/or in a respective plurality of both different axial and different circumferential positions, in order to avoid having to use adhesive tape to fix a partial-format plate to a imaging cylinder.

Thus both partial and full-format plates can be directly clamped at the end edges by the clamping device.

There is a need in the art for integrating a mechanism into an imaging cylinder to clamp and release flexible plates. There further is a need in the art for a clamping mechanism and clamping method that can work for a relatively large number of plate formats and thicknesses.

U.S. patent application Ser. No. 11/331,424 to inventors Koberg et al., titled METHOD AND APPARATUS TO CLAMP AND RELEASE FLEXIBLE PLATES ONTO AN IMAGING CYLINDER and filed on Jan. 12, 2006, describes a method and apparatus for fastening flexible plates onto an imaging cylinder, e.g. for digital flexo plates or rubber, e.g., elastomere plates, or conventional flexo plates. In one embodiment of that patent application, an imaging cylinder includes a clamping device, and the method includes placing end edges of a flexible plate between a clamping element of the clamping device and the outer surface of the cylinder. Springs are used to impart a force onto the placed plate towards the outer surface of the cylinder. An inflatable hose and springs are used to open a space between the clamping element and the outer surface to provide for mounting and unmounting plates. In one embodiment, opening the clamping device is activated by applying air pressure from a pump or external connection. In such a manner, the operator only has to press a button or a foot panel to open or close the clamping device. Another aspect of U.S. patent application Ser. No. 11/331,424 is that by using more clamping devices, placed axially and/or in the circumferential direction, the need for adhesive tape to fix partial format plates onto the cylinder might be avoided. Partial and full-format plates are thus directly clamped at the end edges by the clamping devices.

The U.S. patent application Ser. No. 11/331,424 clamping device(s) require(s) a source of air pressure.

There still is a need in the art for a simpler manually operated method for fastening flexible plates onto an imaging cylinder, and also for an apparatus for carrying this out.

There further is a need in the art for a manually operated method for fastening flexible plates onto an imaging cylinder that includes using independent adjacent manual clamps, one for a leading edge of a plate and the other for a trailing edge of a plate and also for an apparatus for carrying this out.

There further is a need in the art for a manually operated method for fastening flexible plates onto an imaging cylinder that can be placed at different positions on an imaging cylinder, e.g., in one or more different radial and/or different axial positions.

SUMMARY

Described herein is an clamping device and a method for independently fastening each edge of a flexible plate onto an imaging cylinder using an embodiment of the device. The flexible plate can be, e.g. a digital flexo plates or a rubber, e.g., elastomere plate, or a conventional flexo plate. One embodiment of the present invention is an apparatus with independent adjacent clamps to independently fasten each edge of such flexible plates onto an imaging cylinder.

In one embodiment, an imaging cylinder includes a clamping device with a pair of independent adjacent clamping elements, and the method includes placing end edges of a flexible plate between each of the clamping elements of the clamping device and a surface approximately flush with the outer surface of the cylinder. One or more biasing devices, e.g., springs are used to impart a force onto the placed plate towards the surface approximately flush with outer surface of the cylinder. For each independent clamping element, a crank and lever mechanism or other means to translate rotative motion to approximately rectilinear motion is used to open a space between the clamping element and the outer surface when a rotative force is manually applied to provide for mounting and unmounting an end of a plate.

In one embodiment, opening either of the clamping elements of the clamping device is activated by turning an eccentric, e.g., for approximately 180 degrees (a half turn). One aspect includes manually so turning the eccentric.

Another aspect of the invention is that by using more clamping devices, each including a pair of independently operated clamping elements, with each clamping device placed at different axial and/or circumferential locations, the need for adhesive tape to fix partial format plates onto the cylinder might be avoided. Partial and full-format plates are thus directly clamped at the end edges by the clamping of clamping elements of the clamping devices.

DETAILED DESCRIPTION OF EMBODIMENTS

One embodiment includes a clamping device that includes two clamping elements each for clamping an end of one or more plates onto an imaging cylinder that includes the clamping device. Another embodiment is a method for clamping a plate onto the outer surface of an imaging cylinder.

Figure 1:
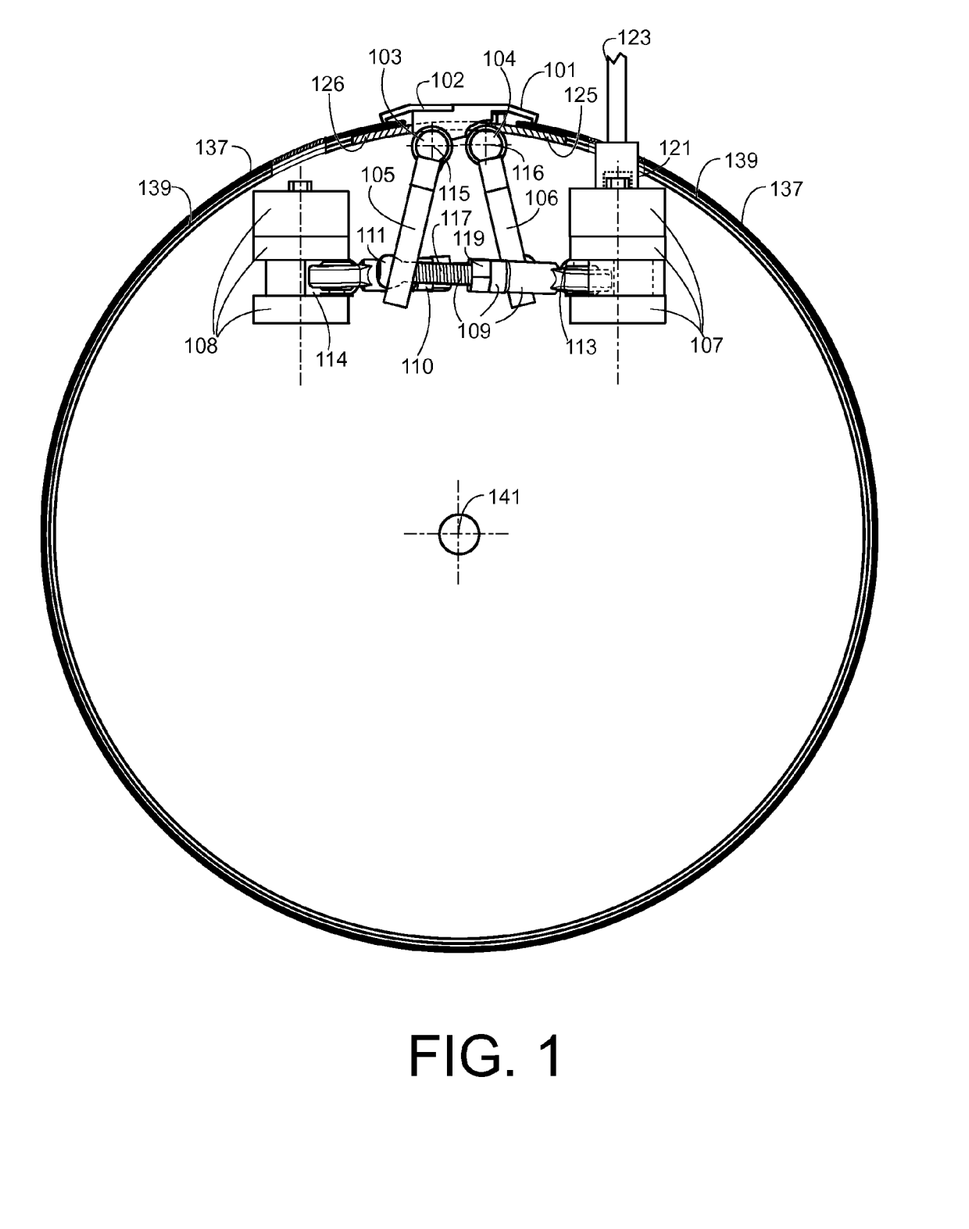
FIG. 1 shows a cross section of a cylinder that includes a clamping device embodiment of the present invention. The cylinder's clamping device is shown in the plate holding ("closed") position, with one plate clamped on the circumference of the cylinder using an embodiment of a clamping device in accordance with an aspect of the present invention.

FIG. 1 shows a cross section of a cylinder 139 that is rotatable about an axis 141 and that includes a clamping device embodiment of the present invention. The axis 141 defines an axial direction that is perpendicular to the plane of the drawing. The cylinder 139 is, for example, the cylinder of an external drum imaging device for imaging flexographic plates or flexographic plate segments. The cylinder is shown open to make the clamping device visible. The cylinder's clamping device is shown in the plate holding ("closed") position, with one plate 137 clamped on the circumference of the cylinder 139.

One embodiment includes a clamping device that extends in the axial direction of the cylinder and is fixed to, or incorporated into the cylinder. The clamping device includes a first part that includes a first clamping element 101 that extends in the axial direction and a matching first surface 125 that also extends in the axial direction and that is approximately flush with the outer surface of the cylinder. In one embodiment, the surface 125 is a clamping bar 125 that extends in the axial direction, and in another embodiment, the surface 125 is part of the outer surface of the cylinder 139. The clamping device also includes a second part that includes a second clamping element 102 extending in the axial direction, and a matching second surface 126, e.g., a second clamping bar 126 that also extends in the axial direction. The first and second parts are adjacent to each other in the circumferential direction. Each of first and second parts can be used independently to clamp or unclamp the end of a plate onto the respective first or second part of the clamping device by closing or opening a respective gap between the first clamping element 101 and first clamping bar 125, and a respective gap between the second clamping element 102 and the second clamping bar 126. The ends of the plate for the first and second parts can, for example, be the two ends of the same plate, or ends of different plates.

The first and second clamping bars are attached to the cylinder such that they are approximately flush with the outer surface of the cylinder 139. While one embodiment includes a separate first and second clamping bar, in another embodiment, the first and second clamping bars are integral. Furthermore, one embodiment does not include the first and second clamping bars, but rather, the first and second surfaces are the outer surface of the imaging cylinder 139, so that the clamping elements clamp the respective plate end directly onto the outer surface of the cylinder 139.

The end of the clamping device, e.g., in a hollow in the cylinder, includes a mechanism manually operable to cause opening or closing of the gap between one or the other of the clamping elements 101, 102 and its respective clamping bar 125, 126. The first and second clamping elements are attached to a first axle 103 and a second axle 104, respectively. The first and second axles 103, 104 are rotatably attached to the imaging cylinder 139 or the respective clamping bars at one or more places near the outer surface so that the first and second clamping elements 101, 102 and their respective attached axles 103, 104 can each rotate in a first direction relative to the cylinder 139 about a respective axis of rotation 115, 116 to move the respective clamping element 101, 102 away from the respective clamping bars 125, 126 flush with the outer surface of the cylinder to each form a respective gap between the respective clamping bar 125, 126 and the respective clamping element 101, 102, with the motion of one clamping element independent of the motion of the other clamping element. Each clamping element 101, 102 and its respective attached axle 103, 104 can also rotate in the direction opposite the first direction about the same respective axis 115, 116 to close the gap formed between the respective clamping bar 125, 126 flush with the outer surface of the cylinder and the respective clamping element 101, 102.

Other than being rotatable, the axles 103, 104 are fixed to the cylinder or to the clamping bars that in turn are fixed to the cylinder 139.

Attached to the first clamping element 101 and its axle 103, and to the second clamping element 102 and its axle 104 are a first lever 105 and a second lever 106, respectively, each located within the cylinder in the radial direction towards the axis of rotation 141 of the cylinder 139. Moving each respective lever 105, 106 in an approximately rectilinear manner causes each respective attached axle 103, 104 and attached clamping element 101, 102 to rotate about the respective axis 115, 116 to cause the gap between the outer surface of the cylinder 139 and the respective clamping element 101, 102 to open or close.

The first clamping element 101, its axle 103 and the level 105 form a first clamping structure rotatable about the axis 115. The second clamping element 102, its axle 103 and the level 105 form a second clamping structure rotatable about the axis 116. The first and second clamping structures are independently operable to open or close their respective gaps.

Thus, for each clamping structure, e.g. for the first clamping structure, rotating the axle in the first direction forms a gap between the clamping element 101 and the outer surface of the cylinder or the clamping bar 125 in which a flexible printing plate may be inserted. Rotating the axle in the second direction opposite to the first direction closes the gap. The one or more biasing elements, in one embodiment a spring, impart and maintain a force between the clamping element and the outer surface of the cylinder tot the clamping bar such that any gap formed is maintained closed unless forcibly opened. Thus, after a plate is inserted, and the axle rotated in the second direction to close the gap, the edge of the printing plate is maintained clamped into the outer surface of the cylinder.

The clamping device also includes a first biasing mechanism and a second biasing mechanism, each to impart and maintain a respective biasing force between the first clamping element 101 and the first matching surface, e.g., first clamping bar 125, and between the second clamping element 102 and the second matching surface, e.g., first clamping bar 126, respectively, such that for each clamping element, any gap formed is maintained closed unless forcibly opened. In one embodiment, each of the first and the second mechanisms includes one or more biasing elements, e.g., springs. The apparatus is arranged such that for each of the first and second clamping element 101, 102, respectively, when the gap is formed by moving the respective lever 105, 106 to rotate its attached axle 103, 104 and the clamping element 101, 102 in the first direction, an edge of a flexible plate can be placed in the gap, and such that when the respective gap is closed, the edge of the plate is maintained clamped onto the respective clamping bar or the outer edge of the cylinder.

The clamping device further includes for the first rotatable clamping structure a rotatable crank disk 107 that is rotatable attached to the cylinder 139. The rotatable crank disk 107 with a hexagonal bolt-head 121 thereon onto which a socket wrench 123 is attachable from outside the cylinder surface via a cavity through the surface of the cylinder to apply a torque to the rotatable disk 107 via the bolt-head 121 so that turning the wrench 123 causes the rotatable disk to rotate. Eccentrically attached to the disk, e.g., in a hollow 113 in the disk is a connecting rod 109 such that the disk 107 and rod 109 act as a crank and rod mechanism to translate the rotary motion of the crank disk 107 into approximately rectilinear motion by the rod 109. The other end of the rod 109 is attached to the lever 105 of the first clamp structure via a ball head 111.

In a similar manner but in opposite direction to the operation of the adjacent first clamping structure, the clamping device further includes for the second rotatable clamping structure a rotatable crank disk 108 that is rotatable attached to the cylinder 139. The rotatable crank disk 108 with a hexagonal bolt-head thereon onto which a socket wrench is attachable from outside the cylinder surface via a cavity through the surface of the cylinder to apply a torque to the rotatable disk 108 via the bolt-head so that turning the wrench causes the rotatable disk 108 to rotate. Eccentrically attached to the disk 108, e.g., in a hollow 114 in the disk 108 is a connecting rod 110 such that the disk 108 and rod 110 act as a crank and rod mechanism to translate the rotary motion of the crank disk 108 into approximately rectilinear motion by the rod 110. The other end of the rod 110 is attached to the lever 106 of the second clamp structure via a ball head.

In one embodiment, the length of each rod 109, 110 is adjustable, e.g., using rod 109 as an example, by part 117 of the rod having a screw thread, and another part 119 being rotatable to shorten or lengthen the rod 109.

While one embodiment of each crank disk includes a bolt head onto which a socket wrench is attachable, other mechanisms also may be used to cause rotation of each crank disk, including, an attachable crank handle, a build in, e.g., foldable crank handle, and so forth. The invention is not limited by what means are used to impart a torque to the crank disk to rotate it. Furthermore, the shape of the disk is not material to operation of the invention.

While one embodiment uses a crank and rod mechanism to translate the rotary motion into approximately rectilinear motion, any other mechanism configured to translate rotary motion into approximately rectilinear motion may be used in alternate embodiments. One alternate embodiment uses a slider-crank mechanism. Another alternate embodiment uses rack and pinion gears. Thus, a means for translating rotation to approximately rectilinear motion is used.

In one embodiment, the cylinder has a cavity for each bolt head so that a socket wrench can be inserted in the cavity to be able to rotate each crank disk via its respective bolt-head.

Figure 2:
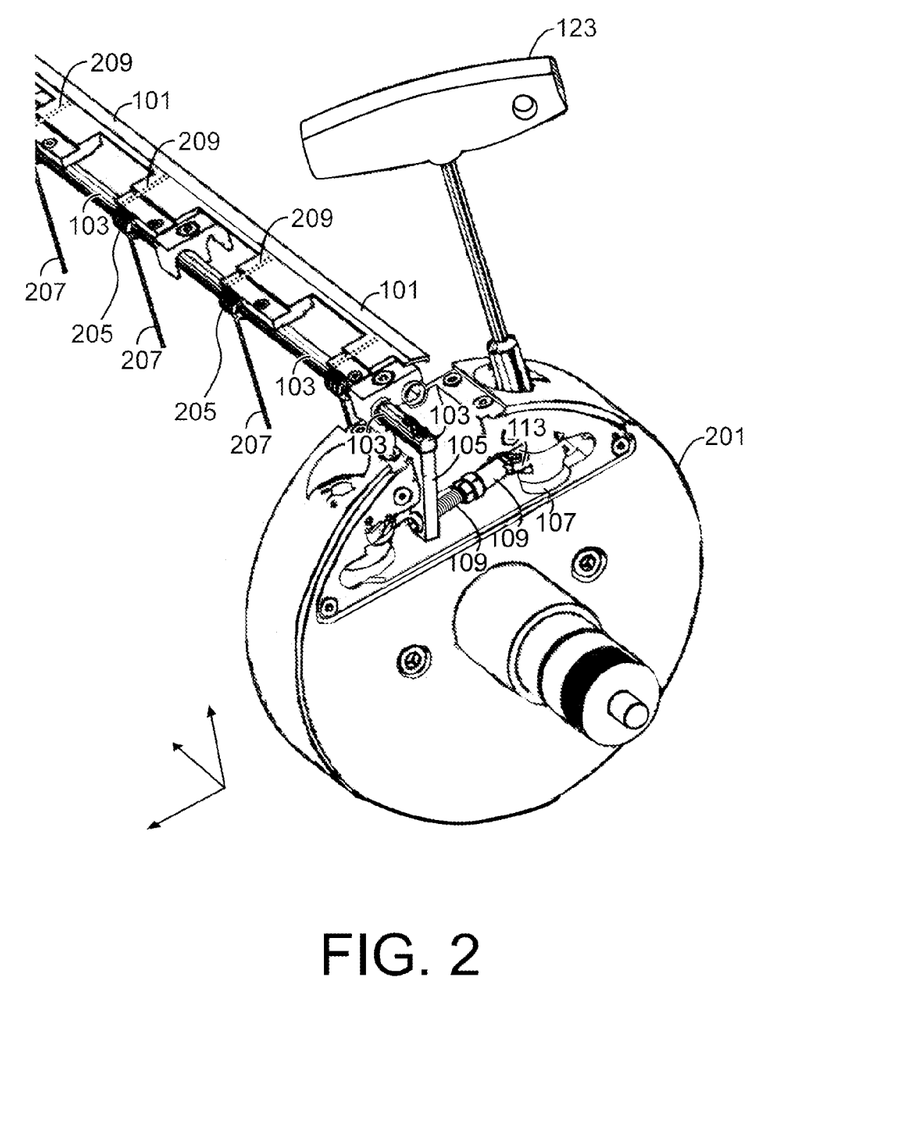
FIG. 2 shows a perspective view of one end 201 of the cylinder with a hollow that includes elements of the first and second clamping structures of one embodiment of the clamping device.

FIG. 2 shows a perspective view of one end 201 of the cylinder with a hollow that includes elements of the first and second clamping structures of one embodiment of the clamping device. One embodiment includes a removable plate that when removed, exposes the hollow so that, for example, the lengths of the respective rods 109, 110 of the first and second clamping structures can be adjusted. FIG. 2 shows the plate removed to expose elements of the clamping structures. Only the first clamping element and its axle 103 is shown to not obscure details of how the structures operate. The bar structure 125 is not shown in order to not mask details of how the first part operates. Shown are the clamping element 101, the axle 103, and the lever 105. Also shown is a socket wrench inserted in the cavity of the surface of the imaging cylinder on the bolt head 121 (not shown) of the crank disk 107. Also shown are the crank disk 107 and rod assembly connected to the lever 105. FIG. 2 includes a socket wrench 123 inserted into the bolt of the first crank disk 107.

In one embodiment, as shown in FIG. 2, the first mechanism to impart a force to keep the gap closed is in the form of one or more legsprings 205 encircling the axle 103 so that a torque is maintained between a first end 207 attached to the cylinder and a short end 209 inserted into matching spaces in the clamping element 101, such that a force is maintained to keep the gap between the first clamping element and the first clamping bar, or the cylinder out surface itself in the case that no clamping bar is used.

Not shown is the second part's second mechanism to impart a force to keep the gap of the second part closed. In one embodiment, the second mechanism is similar to the first mechanism, and is in the form of one or more legsprings encircling the axle 104 so that a torque is maintained between a first end attached to the cylinder and a short end inserted into matching spaces in the clamping element 102, such that a force is maintained to keep the gap between the second clamping element and the second clamping bar, or the cylinder out surface itself in the case that no clamping bar is used.

Figure 3:
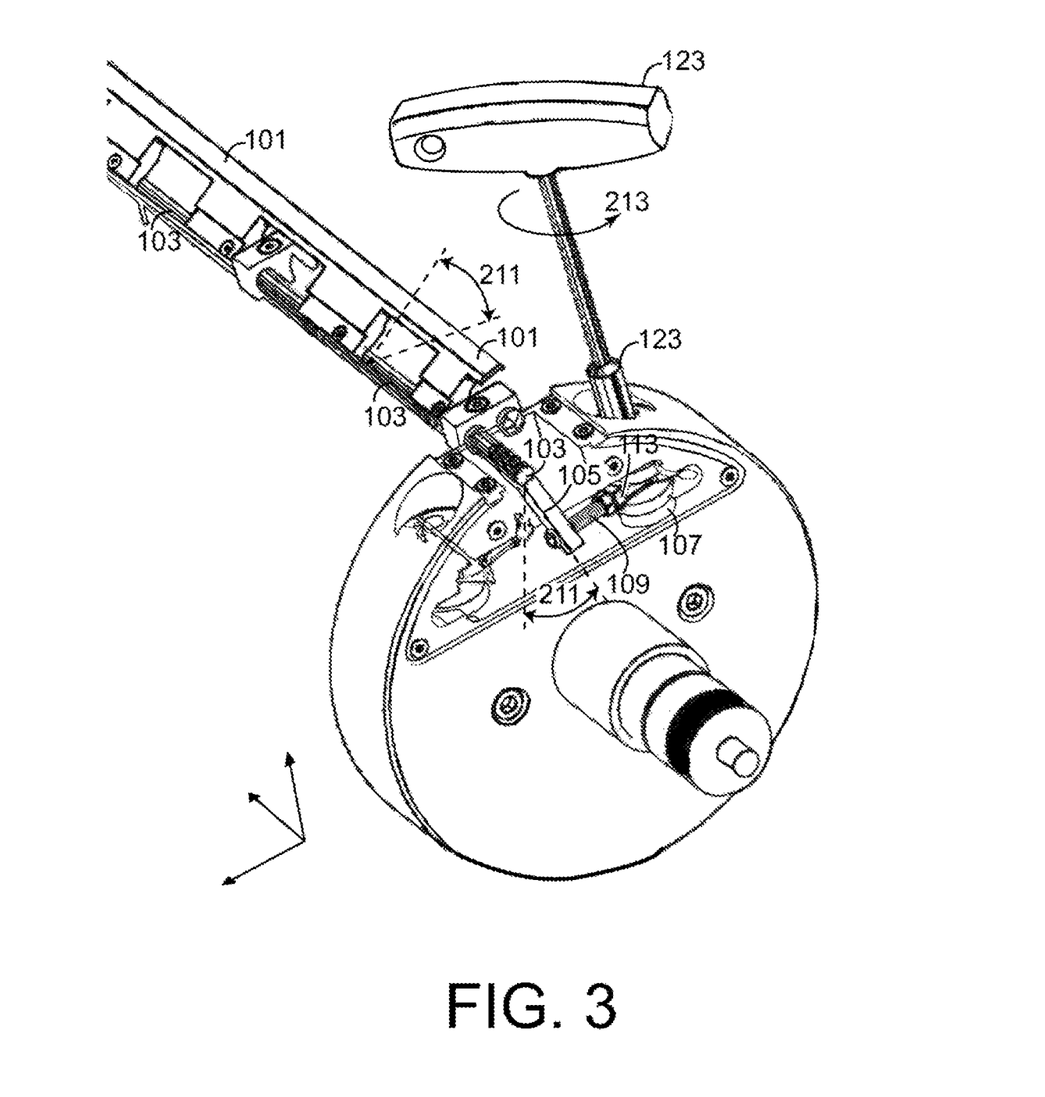
FIG. 3 shows the same structure as FIG. 2, but with the gap of the first clamping element open.

FIG. 3 shows the same structure as FIG. 2, but with the gap of the first clamping element open after the wrench 123 is rotated in the first direction shown as direction 213 to cause the gap to open as a result of the first clamping structure rotating an angle shown as angle 211 in FIG. 3. As in FIG. 2, the bar structure 125 is not shown in order to not mask details of how the part operates. FIG. 3 also does not show the first mechanism to impart a force to keep the gap closed, e.g., the legsprings 205.

By so arranging the clamping structures of the clamping element, each of the different clamping elements can clamp plates of different thicknesses. Furthermore, each part is operable independent of the other adjacent part.

Figure 4A:
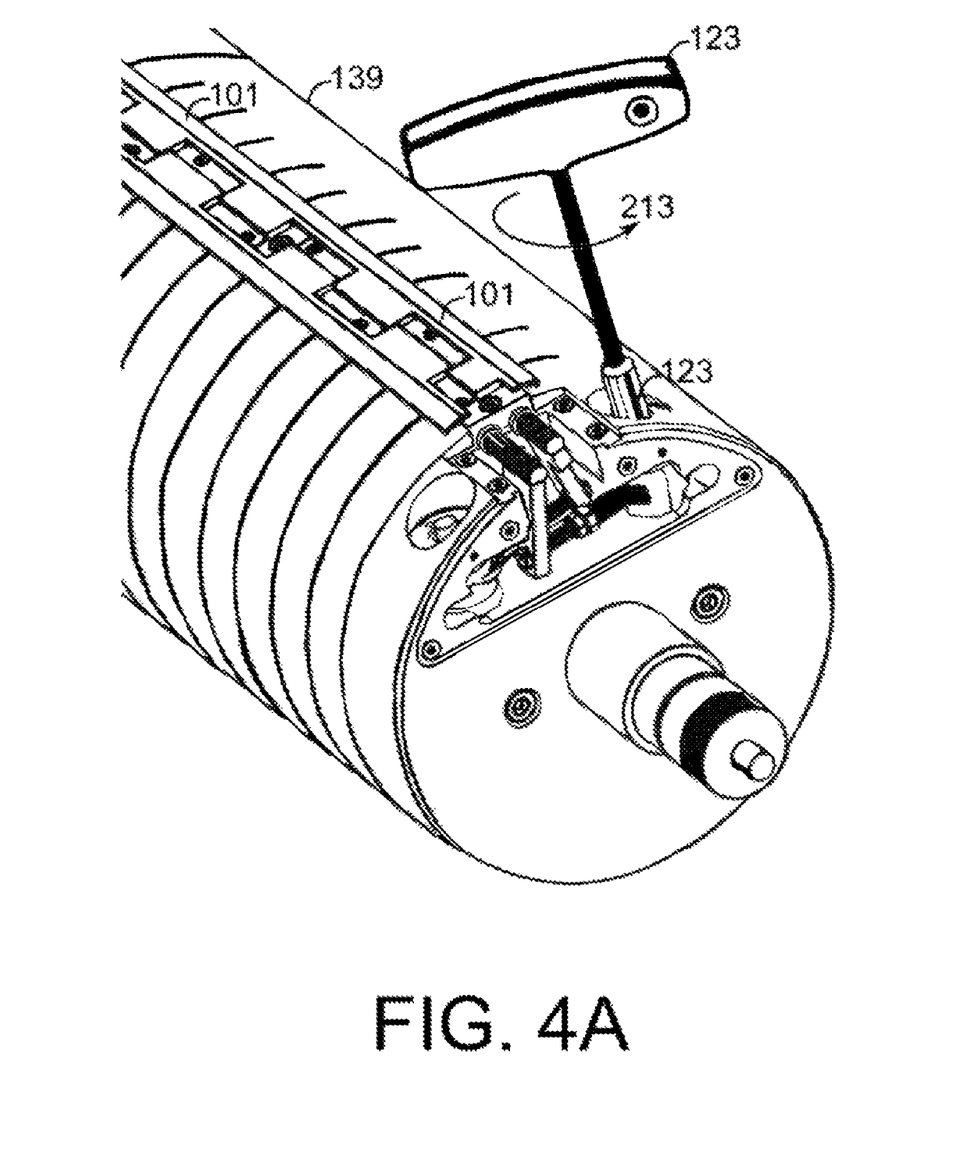
FIGS. 4A, 4B, and 4C each shows a perspective view of part of the imaging cylinder at three different respective stages of opening of the gap of the first clamping structure of the clamping device embodiment.
Figure 4B:
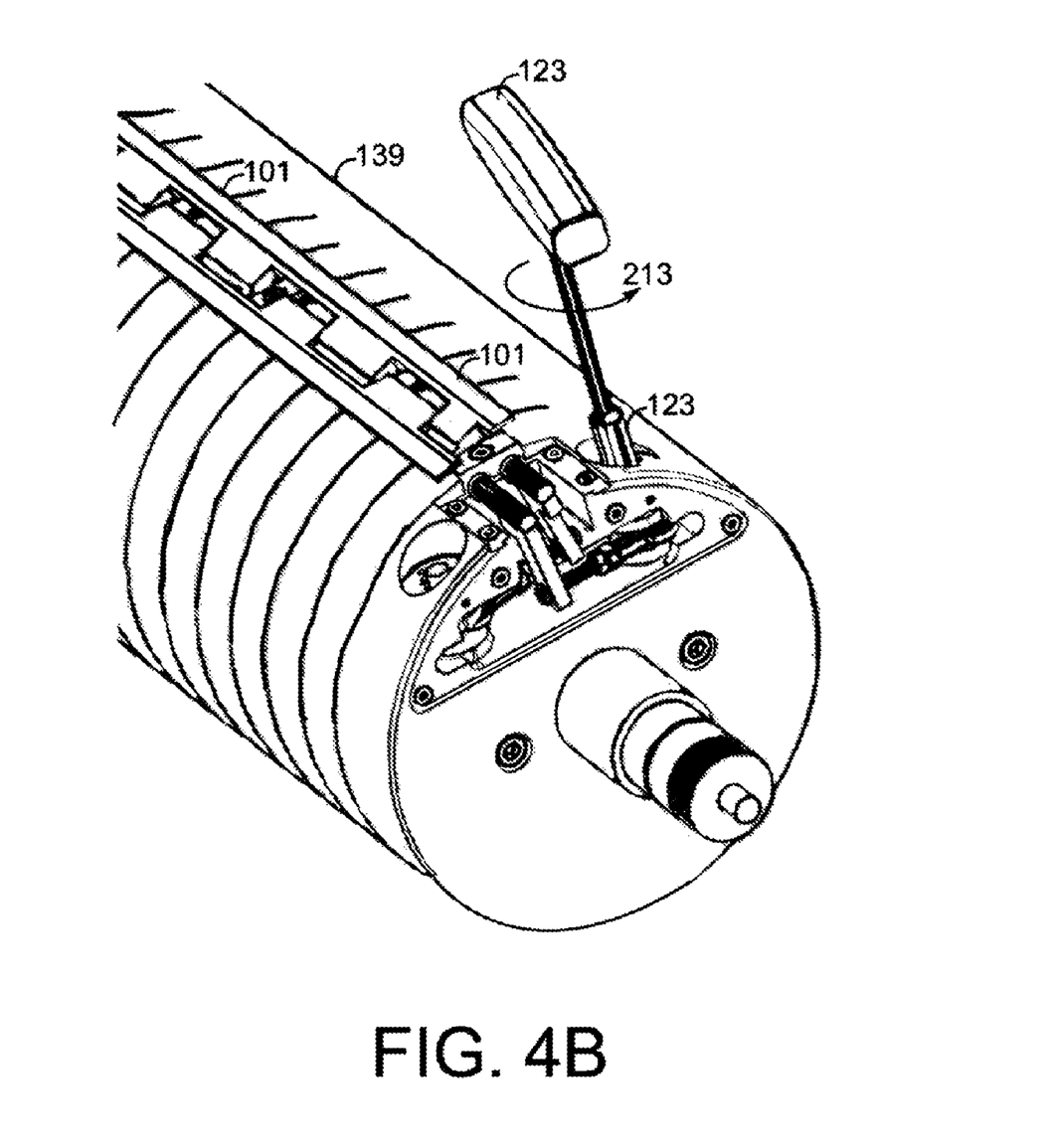
Figure 4C:
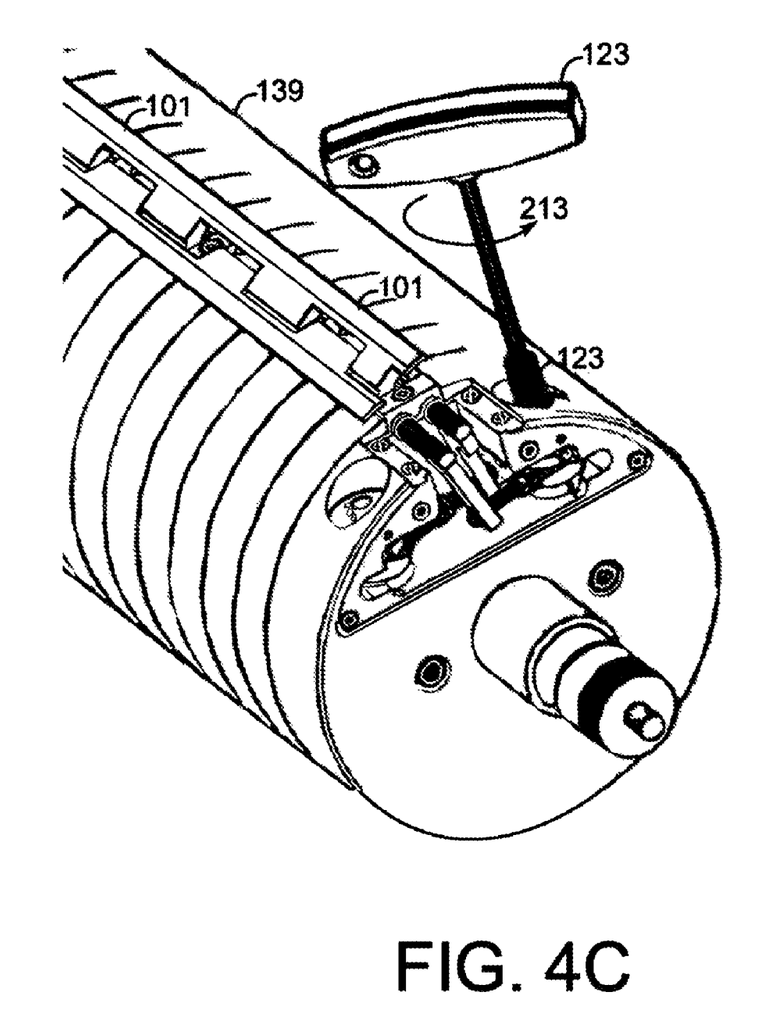

FIGS. 4A, 4B, and 4C each shows a perspective view of part of the imaging cylinder 139 at three different respective stages of opening of the gap of the first clamping structure of the clamping device by rotating a socket wrench 123 shown inserted so that it can be rotated in a first direction 213. The end of the imaging cylinder is shown with the end plate removed to expose the hollow in which the respective crank and rod mechanism 107, 109 and 108, 110, respectively, and the levels 105 and 106, respectively, are located.

FIG. 4A shows the gap closed at a time when the socket wrench 123 starts being rotated in the first direction 213. FIG. 4B shows an intermediate point while the socket wrench is rotated in the first direction 213. FIG. 4C shows the end point with the gap between the first clamping element and the first clamping bar open, which in one embodiment, occurs after the socket wrench, and hence the crank disk are rotated approximately 180 degrees in first direction 213.

Figure 5:
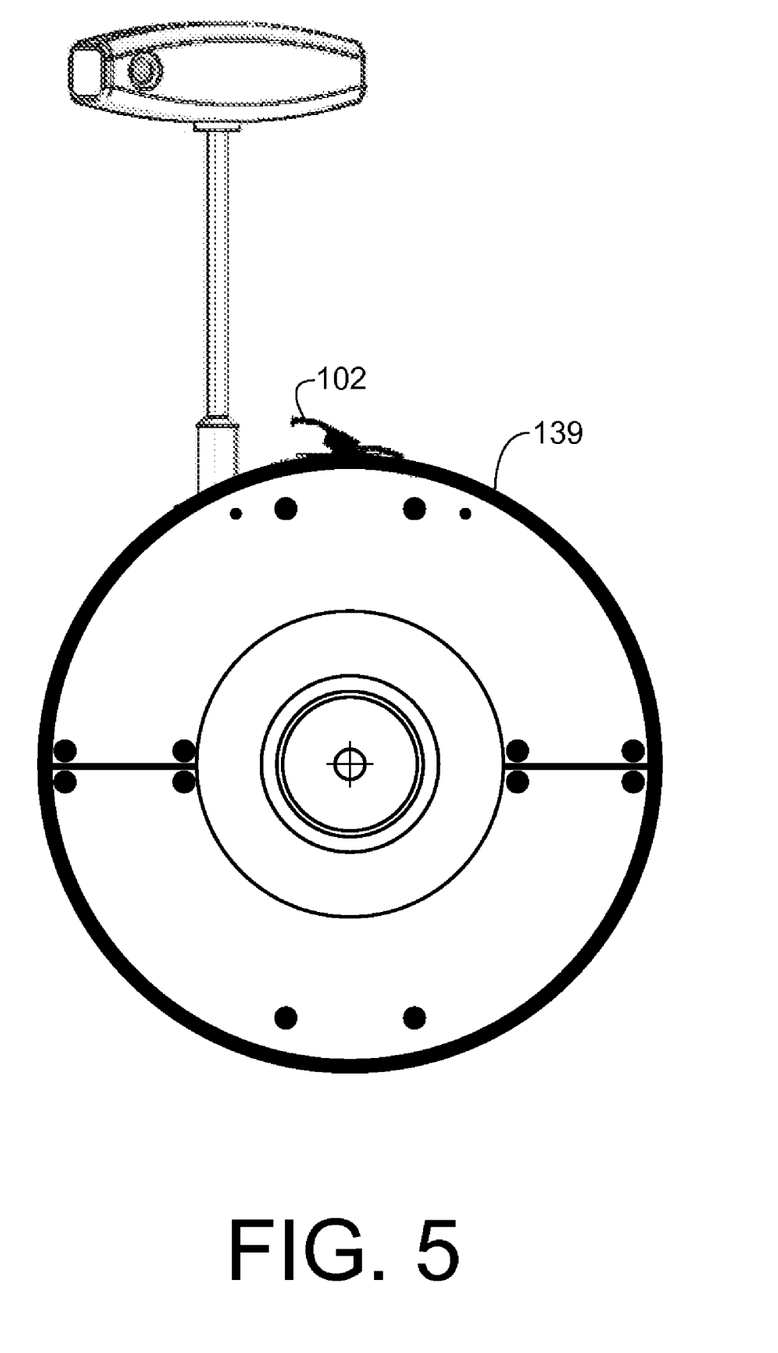
FIG. 5 shows the end of the cylinder and the gap of the second clamping structure of an embodiment of the clamping device open.

FIG. 5 shows the end of the cylinder 139 with the cover plate on the end's hollow and the second structure's gap open by causing the structure with the second clamping element to rotate in what for the second part is the first direction, and with a socket wrench in place to open and close the gap of the second clamping part.

Figure 6:
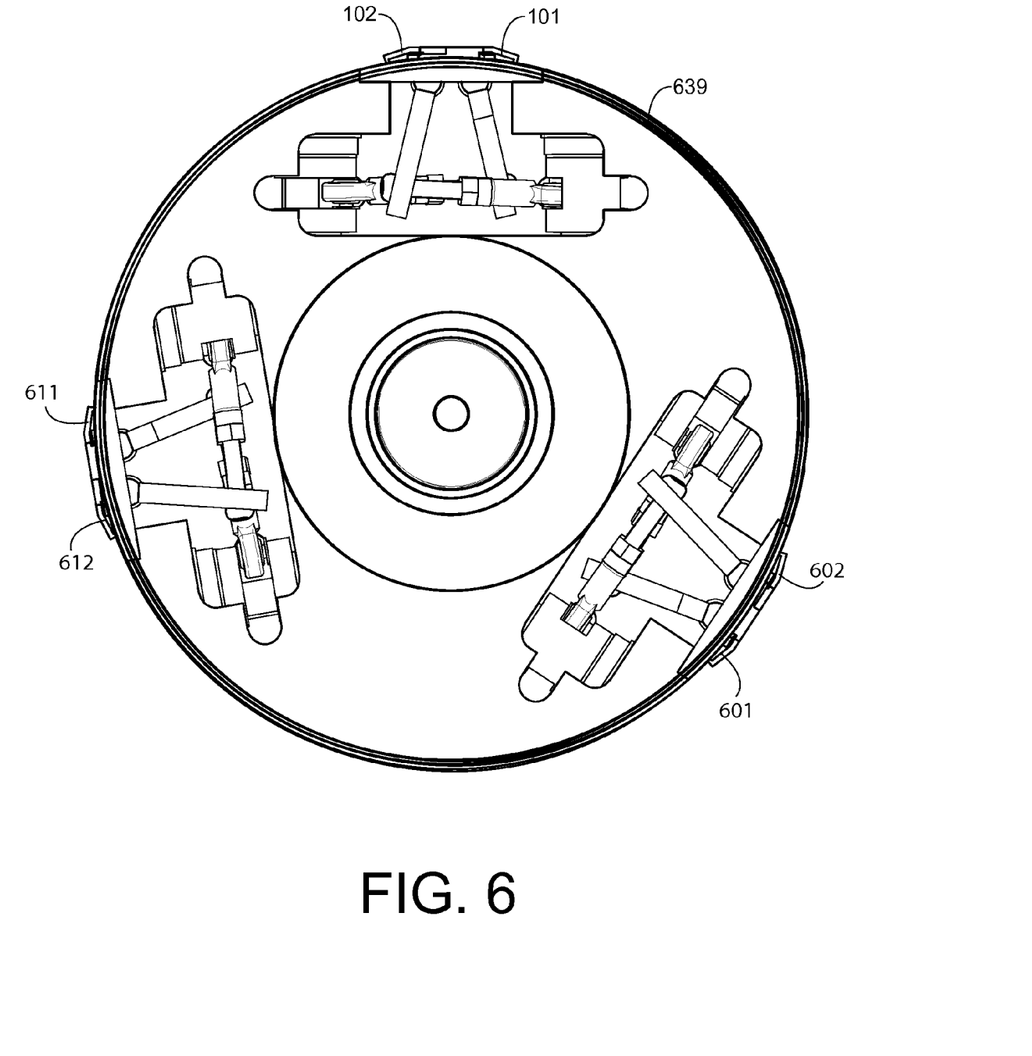
FIG. 6 shows one embodiment that includes a plurality of clamping devices oriented along the axial direction at different circumferential locations in close proximity or on the surface of an imaging cylinder.

FIG. 6 shows one embodiment that includes a plurality of clamping devices oriented along the axial direction at different circumferential locations in close proximity or on the surface of an imaging cylinder 639 such that the clamping of more than one flexible plates in at different axial locations is possible. Each clamping device has a pair of adjacent independently operable parts as described above, each part having a respective clamping element that is operable to form or close a gap between the clamping element and a surface approximately flush with the outer cylinder surface. FIG. 6 shows a cylinder 639 with three instances of the clamping device: the clamping device as in FIG. 1, and additional clamping devices and that respectively include pairs of clamping elements 601, 602 and 611, 612. All three clamping devices are shown in the closed (clamping) position. No plate is shown on the cylinder 639. Having a plurality of clamping devices in the circumferential direction provides for a plurality of plate segments that are shorter in the circumferential direction to be loaded.

Thus, in some embodiments, a plurality of clamping devices are provided in different circumferential locations. One embodiment includes clamping elements distributed at two locations in the circumferential direction. In an alternate embodiment, three locations are used in the circumferential direction. The design decision as to how many locations depends, for example on the number of "standard" plate formats available.

Figure 7:
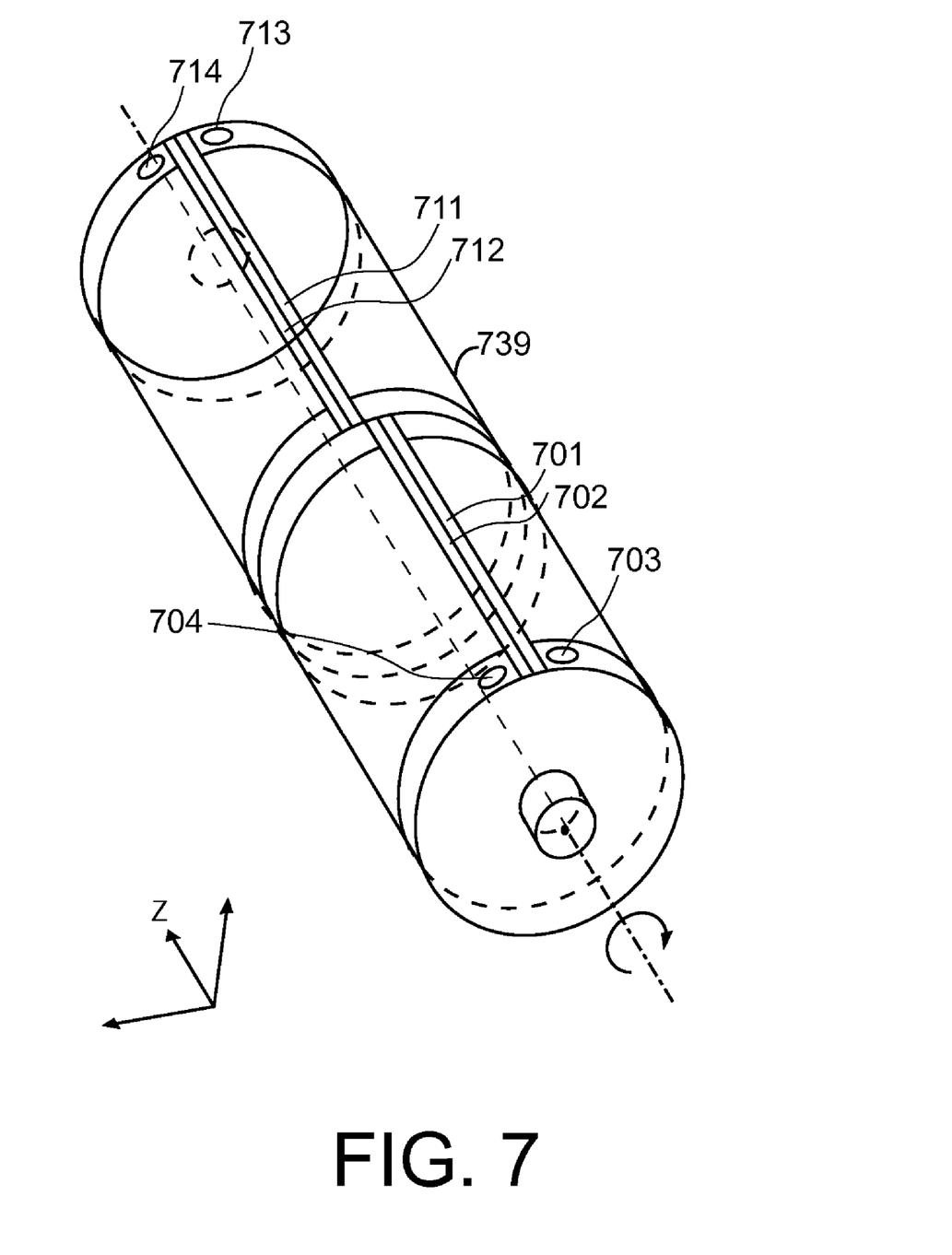
FIG. 7 shows a simplified perspective view of one embodiment that includes a plurality of clamping devices at different axial locations in close proximity or on the surface of an imaging cylinder.

FIG. 7 shows in a simplified perspective view one embodiment that includes a plurality of clamping devices oriented along the axial direction having shorter length than the whole axial extent of the cylinder, and distributed at different axial locations such that the clamping of more than one flexible plates at different axial locations is possible. Each clamping device has a pair of adjacent independently operable parts as described above, each part having a respective clamping element that is operable to form or close a gap between the clamping element and a surface approximately flush with the outer cylinder surface. FIG. 7 shows a cylinder 739 with two instances of the clamping device that is essentially as in FIG. 1, and the clamping devices respectively including pairs of clamping elements 701, 702 and 711, 712. FIG. 7 shows for each clamping device the cavities 703, 704 and 713, 714 through the surface of the cylinder 739. Having a plurality of clamping devices at different axial locations provides for a plurality of plate segments that are shorter in the axial direction to be loaded and imaged simultaneously.

While FIG. 7 shows the two pairs of clamping devices at slightly different circumferential directions, in alternate embodiments, the different clamping devices may be at different circumferential locations, at the same circumferential locations, or some may be at the same circumferential locations, and others at different circumferential locations.

Thus, an alternate embodiment includes a plurality of instances of the clamping device, such clamping devices distributed along the in axial direction of the cylinder, each clamping device adapted to clamp a plate independently of the clamping by the other clamping device(s).

In one embodiment, the cylinder 139, and each of 639 or 739 for the different cylinders with a plurality of clamping devices, has a circumference of approximately 129 cm and an axial length of 210 cm. Such a cylinder can accommodate, for example, plates of 50 in by 80 in.

While apparatus embodiments are described above, another aspect of the invention is a method of loading a plate onto a imaging cylinder by using the apparatus as described herein.

Returning to FIG. 1, note that while the gap is shown being formed between the clamping element 101 and a surface approximately flush with the outer surface of the cylinder 139, the term approximately flush with the outer surface in this context includes the case that the clamping bar or other outer surface is somewhat indented in the area of the clamping device. It should be appreciated that although the invention has been described in the context of flexography, the invention is not limited to such contexts and may be utilized in various other applications and systems for mounting one or more plates or plate segments onto an imaging cylinder.

Thus embodiments of a clamping device have been described. Each clamping device can be located at any circumferential location on an imaging cylinder. Each clamping device includes a pair of independently operable adjacent clamping elements. In one embodiment, the clamping elements open in a curved arc by rotation about a respective axle. Different embodiments can have a plurality of clamping elements at a plurality of locations, e.g., different axial locations, or different circumferential locations, or both different axial and different circumferential locations. In one embodiment, the cylinder incorporates the complete mechanism for operation of the clamping device other than the socket wrench or other mechanical means applying a rotative force. In one embodiment, each clamping device is able to clamp plates of different thicknesses or different materials, or both different thicknesses and different materials.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

All publications, patents, and patent applications cited herein are hereby incorporated by reference.

In the claims below and the description herein, any one of the terms comprising, comprised of, or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. An apparatus comprising:
an imaging cylinder of an imaging device, the cylinder having an outer surface, the imaging cylinder rotatable about an axis that defines an axial direction; and
a clamping device arranged for clamping an edge of one or more flexible plates onto the outer surface of the cylinder,
wherein the clamping device includes:
a first clamping element that extends in the axial direction and a matching first surface that also extends in the axial direction and that is approximately flush with the outer surface of the cylinder, arranged such that by moving the first clamping element away or towards the matching first surface, a first gap is opened or closed, respectively, and such the end of a flexible plate can be inserted in the gap when open;
a first axle attached to the first clamping element and rotatably attached to the imaging cylinder or to the matching first surface such that the first clamping element and its respective attached axle can rotate in a first direction relative to the cylinder about a first axis of rotation to move the first clamping element away from the matching first surface to form the first gap, and in a second direction relative to the cylinder to move the first clamping element towards the matching first surface to close the first gap;

a first lever attached to the first clamping element and its first axle located within the cylinder in the radial direction towards the cylinder's axis of rotation such that moving the first lever in an approximately rectilinear manner causes the attached first axle and attached first clamping element to rotate about the first axis to cause the first gap to open or close;

a first mechanism attached to the first lever to translate rotative motion into approximately rectilinear motion and including a first rotatable element such that turning the first rotatable element attached to the first lever causes the first lever to move in an approximately rectilinear manner to cause the first gap to open or close;

a first biasing mechanism to impart and maintain a biasing force between the first clamping element and the matching first surface arranged such that the first gap is maintained closed unless forcibly opened, a second clamping element that extends in the axial direction and a matching second surface that also extends in the axial direction and that is approximately flush with the outer surface of the cylinder, arranged such that by moving the second clamping element away or towards the matching second surface, a second gap is opened or closed, respectively, and such the end of a flexible plate can be inserted in the gap when open, a second axle attached to the second clamping element and rotatably attached to the imaging cylinder or to the matching second surface such that the second clamping element and its respective attached axle can rotate in a first direction relative to the cylinder about a second axis of rotation to move the second clamping element away from the matching second surface to form the second gap, and in a in a second direction relative to the cylinder to move the second clamping element towards the matching second surface to close the second gap;

a second lever attached to the second clamping element and its second axle located within the cylinder in the radial direction towards the cylinder's axis of rotation such that moving the second lever causes the attached second axle and attached second clamping element to rotate about the second axis to cause the second gap to open or close;

a second mechanism attached to the second lever to translate rotative motion into approximately rectilinear motion and including a second rotatable element such that turning the second rotatable element attached to the second lever causes the second lever to move in an approximately rectilinear manner to cause the second gap to open or close; and a second biasing mechanism to impart and maintain a biasing force between the second clamping element and the matching second surface arranged such that the second gap is maintained closed unless forcibly opened, wherein the first and second clamping elements are adjacent to each other in the circumferential direction, and wherein each of the first or second clamping elements can be used independently to clamp or unclamp respective ends of one or more plates onto the respective first or second clamping element of the clamping device by closing or opening the first or second respective gap.

2. An apparatus as recited in claim 1, wherein the matching first surface and matching second surface are respectively a first clamping bar and a second clamping bar attached to the imaging cylinder.

3. An apparatus as recited in claim 1, wherein the first and second biasing mechanisms each include one or more springs.

4. An apparatus as recited in claim 1, wherein the first and second biasing mechanisms each include one or more legsprings around the respective axles at one or more locations.

5. An apparatus as recited in claim 1, wherein each mechanism to translate rotative motion includes a crank disk and a rod, one end of each rod eccentrically attached to the respective crank disk, and the other end to the respective lever.

6. An apparatus as recited in claim 1, further comprising at least one other instance of the clamping device such that the cylinder includes a plurality of clamping devices at different respective axial locations, each clamping device including a respective pair of adjacent independently movable clamping elements, such that a plurality of plates of different thickness are able to be placed distributed in the axial direction of the cylinder and clamped onto the outer surface of the cylinder.

7. An apparatus as recited in claim 1, further comprising at least one other instance of the clamping device such that the cylinder includes a plurality of clamping devices distributed along the circumferential direction of the cylinder at different respective circumferential locations, each clamping device including a respective pair of adjacent independently movable clamping elements, such that a plurality of plates of different formats may be clamped onto the outer surface of the cylinder.

8. An apparatus as recited in claim 7 including at least one instance of the clamping device at a different axial location to at least another instance of the clamping device.

9. A method, comprising:

moving a first clamping element of a clamping device extending in the axial direction of an imaging cylinder of an imaging device, the cylinder having an outer surface, the clamping element located adjacent to the outer surface of the cylinder, the moving being in a direction away from a first surface approximately flush with the outer surface of the cylinder to form a first gap between the first surface and the first clamping element, the clamping device further including a second clamping element extending in the axial direction of the imaging cylinder adjacent to the first clamping element and independently movable;

placing a first edge of a first flexible plate in the first gap between the first surface and the first clamping element;

moving the first clamping element in a direction opposite to the first direction to close the first gap;

automatically maintaining a compressive force onto the first edge placed in the first gap via the clamping element to hold the first edge in a clamped state;

moving the second clamping element of the clamping device in a direction away from a second surface approximately flush with the outer surface of the cylinder to form a second gap between the second surface and the second clamping element;

placing a second edge of a flexible plate in the second gap between the second surface and the second clamping element;

moving the second clamping element in a direction opposite to the first direction to close the second gap; and automatically maintaining a compressive force onto the second edge placed in the second gap via the clamping element to hold the second edge in a clamped state, wherein the compressive force maintained onto the first edge is sufficient to hold the plate without the plate needing to have holes at the first edge through which dowels or pins connected to the first clamping element are needed for holding and tensioning the plate, and wherein the moving of the first clamping element is by manually applying a rotative force to a mechanism that translates rotative force to rectilinear force on a first rod coupled to a first lever that causes a first axle rotatively coupled to the imaging cylinder and attached to the first clamping element to rotate to open or close the first gap, and wherein the moving of the second clamping element is by manually applying a rotative force to a mechanism that translates rotative force to rectilinear force on a second rod coupled to a second lever that causes a second axle rotatively coupled to the imaging cylinder and attached to the second clamping element to rotate to open or close the second gap.

10. A system comprising:

a first clamping element extending in the axial direction of an imaging cylinder of an imaging device, the cylinder having an outer surface, the first clamping element located adjacent to the outer surface of the cylinder;

means for moving operative to move the first clamping element in a direction away from a first surface approximately flush with the outer surface of the cylinder to form a first gap between the first surface and the first clamping element;

a second clamping element extending in the axial direction of the imaging cylinder adjacent to the first clamping element and independently movable to the moving of the first clamping element; such that a first edge of a first flexible plate can be placed in the first gap between the first surface and the first clamping element; wherein the means for moving the first clamping element also is operative to move the first clamping element in a direction opposite to the first direction to close the first gap;

means for automatically maintaining a compressive force onto the first edge after the first edge is placed in the first gap, compressive force maintained via the first clamping element to hold the first edge in a clamped state;

means for moving the second clamping element in a direction away from a second surface approximately flush with the outer surface of the cylinder, the means for moving the second clamping element being operative to move the second clamping element to form a second gap between the second surface and the second clamping element such that a second edge of a flexible plate can be placed in the second gap between the second surface and the second clamping element; wherein the means for moving the second clamping element is operative to move the second clamping element in a direction opposite to the first direction to close the second gap; and means for automatically maintaining a compressive force onto the second edge after the second edge is placed in the second gap via the second clamping element to hold the second edge in a clamped state, wherein the compressive force maintained onto the first edge is sufficient to hold the plate without the plate needing to have holes at the first edge through which dowels or pins connected to the clamping element are needed for holding and tensioning the plate, wherein the means for moving of the first clamping element is operative to move the first clamping element by manually applying a rotative force to a mechanism that translates rotative force to rectilinear force on a first rod coupled to a first lever that causes a first axle rotatively coupled to the imaging cylinder and attached to the first clamping element to rotate to open or close the first gap, and wherein the means for moving the second clamping element is operative to move the second clamping element by manually applying a rotative force to a mechanism that translates rotative force to rectilinear force on a second rod coupled to a second lever that causes a second axle rotatively coupled to the imaging cylinder and attached to the second clamping element to rotate to open or close the second gap.

11. A system as recited in claim 10, wherein the means for automatically maintaining a compressive force onto the first edge placed in the first gap uses one or more springs.

12. A system as recited in claim 10, wherein the means for automatically maintaining a compressive force onto the second edge placed in the second gap uses one or more springs.

* * * * *

UNITED STATES PATENT AND TRADEMARK OFFICE
CERTIFICATE OF CORRECTION

| | | |
|---|---|---|
| PATENT NO. | : 8,100,054 B2 | Page 1 of 1 |
| APPLICATION NO. | : 11/841554 | |
| DATED | : January 24, 2012 | |
| INVENTOR(S) | : Koberg | |

It is certified that error appears in the above-identified patent and that said Letters Patent is hereby corrected as shown below:

In Column 5, line 55, after "cylinder", kindly replace "tot" with --to--.

In Column 5, line 59, after "clamped", kindly replace "into" with --onto--.

Signed and Sealed this
Sixth Day of March, 2012

David J. Kappos
*Director of the United States Patent and Trademark Office*